United States Patent
Nakagaki et al.

[11] Patent Number: 6,049,410
[45] Date of Patent: Apr. 11, 2000

[54] STRUCTURE OF SPATIAL LIGHT MODULATOR AND LIGHTING SYSTEM THEREFOR

[75] Inventors: Shintaro Nakagaki, Miura; Tsutou Asakura, Odawara; Fujiko Koyama, Yokohama; Tatsuru Kobayashi, Yokosuka, all of Japan

[73] Assignee: Victor Company of Japan, Ltd., Yokohama, Japan

[21] Appl. No.: 09/206,989

[22] Filed: Dec. 8, 1998

[30] Foreign Application Priority Data

Dec. 12, 1997 [JP] Japan .................................. 9-362746
Dec. 26, 1997 [JP] Japan .................................. 9-368249

[51] Int. Cl.[7] .......................... G02F 1/03; G02F 1/1335; G02B 5/30
[52] U.S. Cl. .............................. 359/253; 359/496; 349/5; 349/63
[58] Field of Search .................................. 359/253, 496, 359/502; 349/5, 63

[56] References Cited

U.S. PATENT DOCUMENTS 5,706,066  1/1998  Sawayama et al. .................... 349/113

FOREIGN PATENT DOCUMENTS 09189809A  10/1996  Japan .
9-189809   7/1997   Japan .

Primary Examiner—Scott J. Sugarman
Assistant Examiner—Adrianne Riviere
Attorney, Agent, or Firm—Louis Woo

[57] ABSTRACT

A spatial light modulator and a lighting system used in, for example, projection displays are provided. The lighting system has a polarizing plate optically disposed in parallel to a light modulating layer of the spatial light modulator, thereby orienting the polarization of readout light beams incident on the spatial light modulator in the same direction to increase the contrast of images projected on a screen. The spatial light modulator is provided with a coupling prism having a side surface opposed to an entrance surface on which the readout light beams are incident. The side surface is so inclined inward as to allow stray light in the coupling prism to go out of the coupling prism without being reflected, thereby eliminating a decrease in contrast of images with a screen caused by the stray light.

7 Claims, 6 Drawing Sheets

STRUCTURE OF SPATIAL LIGHT MODULATOR AND LIGHTING SYSTEM THEREFOR

BACKGROUND OF THE INVENTION

1. Technical Field of the Invention

The present invention relates generally to a spatial light modulator and a lighting system therefor, and more particularly to improved structures of a spatial light modulator and a lighting system for producing a contrasty modulated light in projection displays, projectors, and optical information processing devices.

2. Background of Related Art

Nowadays, projection displays using a liquid-crystal panel as a spatial light modulator are being developed. Particularly, projection displays using a reflective liquid-crystal panel are attractive since the aperture ratio of transmission liquid-crystal panels is 50%, while that of the reflective liquid-crystal panels may be increased more than 90%. Projection displays of this type are already put into practical use for a specified purpose.

FIG. 1 shows a lighting system and a spatial light modulator of a conventional projection display using a reflective liquid-crystal panel.

The spatial light modulator 1 is made of a lamination of the reflective liquid-crystal panel 5, the glass plate 6, and the coupling prism 7.

The liquid-crystal panel 5 has a structure in which MOS transistors and Al-made reflective mirrors (i.e., pixel electrodes) are formed on an Si substrate on a pixel basis, and a liquid-crystal layer is formed between the Si substrate and a transparent common electrode. Modulation and reflection of readout light incident on the liquid-crystal layer in units of pixel are achieved by activating a portion of the liquid-crystal layer between one of the reflective mirrors and the common electrode through an active matrix system.

The MOS transistors and their connection wires may be disposed below the reflective mirrors to use almost the entire surface of the panel as a reflective surface regardless of size of the MOS transistors, thereby achieving a great aperture ratio, as discussed above, even if the pixels are increased greatly.

The lighting system includes the polarizing plate 2, the integrator 3, and the light source 4 such as a tungsten lamp or a metal halide lamp.

The unpolarized light is emitted from the light source 4 and enters the polarizing plate 2 through the integrator 3 wherein only a component of the unpolarized light polarized in one direction (i.e., an s-polarized component) is selectively allowed to pass therethrough and falls on the spatial light modulator 1. The optical axis of a luminous flux of the unpolarized light incident on the polarizing plate 2 is oriented at a given angle θ to a normal at any point on the liquid-crystal layer of the reflective liquid-crystal panel 5 so that the s-polarized component (i.e., readout light) emerging from the polarizing plate 2 diagonally enters (i.e., an incident angle=θ) the liquid-crystal layer through the coupling prism 7 and the glass plate 6.

The entrance surface 7a of the coupling prism 7 is oriented perpendicular to the optical axis of the unpolarized light, and the coupling prism 7 and the glass plate 6 are made of glass materials having the same index of refraction, so that the readout light enters the liquid-crystal layer directly without undergoing refraction.

Although not illustrated in the drawing, a cold mirror may be interposed between the integrator 3 and the polarizing plate 2 for removing components within a waveband of infrared light. Further, three-plate projection displays designed to produce full color images may separate the incident light into R, G, and B rays and transmit them to corresponding liquid-crystal panels, respectively. Optical paths defined between the projection display and the liquid-crystal panels are commonly curved.

The s-polarized component incident on the liquid-crystal layer is reflected and returned by the reflective mirror to the liquid-crystal layer and undergoes modulation by control of transition of liquid-crystal molecules through activities of the reflective liquid-crystal panel 5 in response to a pixel signal, so that only a p-polarized component (i.e., modulated light) whose plane of polarization is rotated on a pixel basis is outputted from the glass plate 6 to the coupling prism 7 and emerges from an exit surface thereof, which is, in turn, directed to a projection optical system (not shown) so that an image is projected onto a screen.

In the above described projection display, the polarizing plate 2, as can be seen in the drawing, has a polarized light selecting plane oriented perpendicular to the optical axis of a luminous flux of incident light. Specifically, the polarizing plate 2 has the transmission axis oriented perpendicular to the drawing of FIG. 1 to allow a component of incident light parallel to the transmission axis to pass therethrough.

The light source 4 is not an ideal point source of light, but a source of radiation having a limited extension in space. The integrator 3 includes a first lens plate 3a and a second lens plate 3b. The first lens plate 3a has fine lens segments disposed thereon in a matrix arrangement which produce a plurality of secondary sources of light. Each of the lens segments of the second lens plate 3b converges the incident light on a flat area (i.e., a readout light-illuminated area) of the liquid-crystal layer of the reflective liquid-crystal panel 5. Specifically, a collection of conical fluxes of light is incident on the polarizing plate 2. Of each of the conical fluxes, other than light beams perpendicular to the entrance surface of the polarizing plate 2 enters the polarized light selecting plane of the polarizing plate 2 at angles other than 90°.

FIG. 2 shows a polarized light selecting function performed by the polarizing plate 2.

The polarized light selecting plane of the polarizing plate 2 serves to select a component of incident light to be polarized on a crossed line defined by a plane that is perpendicular to the travel direction of the light and a plane that contains the transmission axis, as indicated by a white arrow, of the polarizing plate 2 and is perpendicular to the polarized light selecting plane and allows the selected component to pass therethrough.

Thus, of the light beam (A) incident at right angles to the polarized light selecting plane of the polarizing plate 2, a component whose direction of polarization is identical with the transmission axis of the polarizing plate 2 (i.e., the s-polarized component [S]) is selected and allowed to pass through the polarizing plate 2. Of the light beam (B) incident diagonally on the polarized light selecting plane of the polarizing plate 2, a component whose direction of polarization is on a plane that contains the transmission axis and is perpendicular to the polarized light selecting plane (i.e., the s-polarized component [S']) is selected and allowed to pass through the polarizing plate 2.

The s-polarized components [S] and [S'] fall on the readout light-illuminated region 5a of the reflective liquid-crystal panel 5. The direction of polarization of the s-polarized component [S] is parallel to the surface of the region 5a, while the direction of polarization of the s-polarized component [S'] is not parallel to the surface of the region 5a. Specifically, the direction of polarization of each light beam incident on the polarizing plate 2 depends upon an incident angle thereof. The region 5a is, thus, illuminated by light beams whose directions of polarization are different from each other, which will cause the light beams incident on the reflective liquid-crystal panel 5 to undergo different modulations, thus resulting in reduction in contrast of an image formed by the modulated lights with a screen.

SUMMARY OF THE INVENTION

It is therefore a principal object of the present invention to avoid the disadvantages of the prior art.

It is another object of the present invention to provide a lighting system designed to produce a contrasty modulated light in projection displays, projectors, optical information processing devices, etc.

It is a further object of the present invention to provide a spatial light modulator designed to minimize the amount of undesired stray light traveling therein.

According to one aspect of the present invention, there is provided a lighting apparatus for use in a spatial light modulator which comprises: (a) a light source emitting a luminous flux of unpolarized light whose optical axis is oriented with a given inclination to a light modulating layer of a spatial light modulator; and (b) a polarizing element selectively allowing a component of the unpolarized light polarized only in one direction to pass therethrough and directing the polarized component to the light modulating layer of the spatial light modulator as readout light. The polarizing element is so disposed in an optical path of the luminous flux that a polarized light selecting plane of the polarizing element is optically oriented parallel to the light modulating layer of the spatial light modulator.

In the preferred mode of the invention, the spatial light modulator has a refracting element disposed between the polarized light selecting plane of the polarizing element and the light modulating layer of the spatial light modulator. The polarized light selecting plane of the polarizing element is oriented with an inclination to the light modulating layer of the spatial light modulator according to an index of refraction of the refracting element.

The polarizing element is a polarizing plate or a polarizing beam splitter.

According to another aspect of the invention, there is provided a spatial light modulator which comprises: (a) a liquid-crystal panel modulating an incident ray in units of pixel; (b) a holographic color filter disposed parallel to the liquid-crystal panel, diffracting and separating components polarized linearly in one direction from readout light incident at a given angle, the holographic color filter converging the linearly polarized components on corresponding pixels of primary colors; and (c) a coupling prism having upper and bottom surfaces, connected at the bottom surface to an entrance surface of the holographic color filter on which the readout light is incident. The coupling prism also has two opposed side surfaces between the upper and bottom surfaces one of which is an entrance surface through which the readout light emitted from a light source is transmitted at the given angle to the holographic color filter and the other of which is defined by a plane which is perpendicular to a plane containing an optical axis of the readout light incident on the coupling prism and a line perpendicular to a surface of the holographic color filter connected to the coupling prism and which is inclined toward the entrance surface of the coupling prism, making substantially the same angle as the given angle of incidence of the readout light with the surface of the color filter connected to the coupling prism.

In the preferred mode of the invention, the liquid-crystal panel is of a reflective type. The holographic color filter converges the linearly polarized components at right angles on the corresponding pixels of primary colors. The coupling prism has the entrance surface defined by a plane perpendicular to the optical axis of the readout light emitted from the light source and the upper surface defined by a plane oriented parallel to the bottom surface.

A transparent medium is further provided which has a high index of refraction and which is interposed between the bottom surface of the coupling prism and the entrance surface of the holographic color filter.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 3:
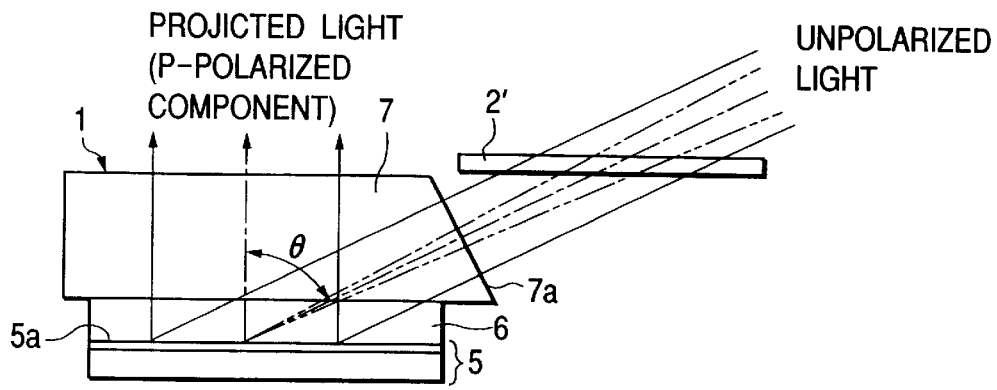
FIG. 3 is a cross sectional view which shows a projection display according to the first embodiment of the invention.

Referring now to the drawings, particularly to FIG. 3, there is shown a lighting system and a spatial light modulator of a projection display according to the present invention. The same reference numbers as employed in FIG. 1 will refer to the same parts, but the integrator 3 and the light source 4 are omitted for the brevity of illustration.

This embodiment features parallel orientation of a polarized light selecting plane of the polarizing plate 2' to a liquid-crystal layer of the spatial light modulator 1.

Specifically, the optical axis of a luminous flux of light emitted from the light source through the integrator is oriented at an angle of (90–θ)° to the polarized light selecting plane of the polarizing plate 2' so that the light emitted from the light source enters the polarizing plate 2' with a given inclination.

Next, the polarized light selecting function performed by the polarizing plate 2' will be described below with reference to FIG. 4.

For example, when the light beam (A) that is one of light beams traveling diagonally and that is perpendicular to the transmission axis of the polarizing plate 2' enters the polarizing plate 2', only a component of the light beam (A) (i.e., the s-polarized component) on a crossed line defined by a plane that is perpendicular to the travel direction of the light beam (A) and a plane that contains the transmission axis of the polarizing plate 2', as indicated by a white arrow, and is perpendicular to the polarized light selecting plane is selectively allowed to pass through the polarizing plate 2'.

When the light beam (B) that is not perpendicular to the transmission axis of the polarizing plate 2' enters the polarizing plate 2', the polarizing plate 2' performs the same polarized light selecting function as described above, but only a component $[Sy]=S'\cos\alpha$ that corresponds to a resolved vector of the s-polarized component [S'] in the direction of transmission axis is selectively allowed to pass through the polarizing plate 2' since the direction of polarization of the s-polarized component [S'] of the light beam (B) is shifted away from the transmission axis of the polarizing plate 2' by an angle α in a plane.

The s-polarized components [S] and [Sy] emerging from the polarizing plate 2' fall on the region 5a of the reflective liquid-crystal panel 5. Since the directions of polarization of the s-polarized components [S] and [Sy] are both parallel to the transmission axis of the polarizing plate 2', the s-polarized components [S] and [Sy] become beams of readout light on the region 5a which have the same direction of polarization.

Figure 1:
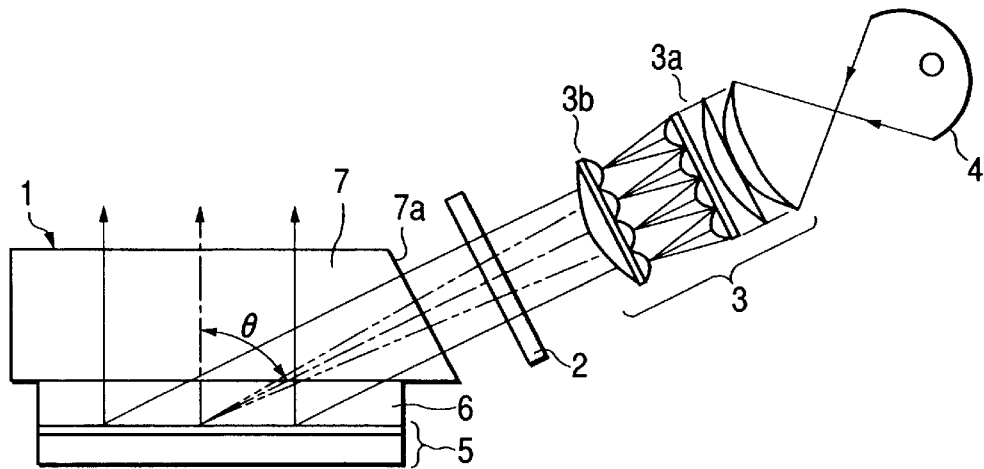
FIG. 1 is a cross sectional view which shows a conventional projection display.
Figure 2:
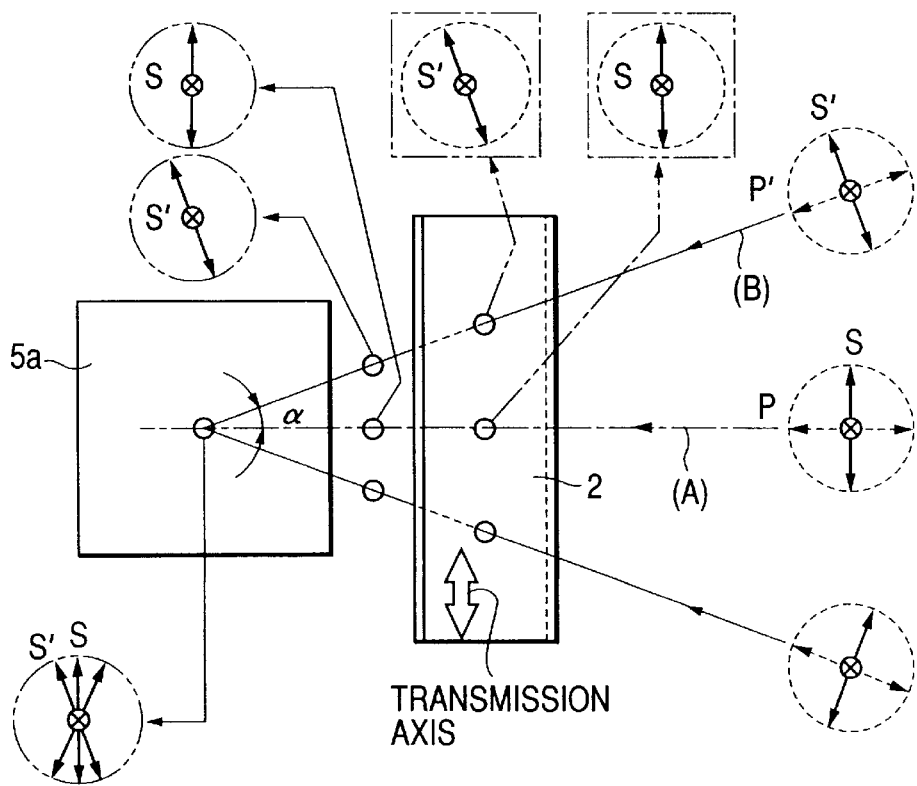
FIG. 2 is an illustration which shows polarization of beams of readout light passing through a polarizing plate and falling on a liquid-crystal panel of a spatial light modulator in the projection display in FIG. 1.

Specifically, if the polarizing plate 2' is, as shown in FIG. 1, disposed perpendicular to the luminous flux of incident light, it will cause the s-polarized component [S'] of the light beam (B) which is not perpendicular to the transmission axis of the polarizing plate 2' to have the direction of polarization different from that of the s-polarized component [S] on the region 5a. The polarizing plate 2' in this embodiment, however, polarizes the light beam (B) to produce the s-polarized component [Sy] which is oriented at an angle α to the s-polarized component [S] about the optical axis of the light beam (B). As a result, the s-polarized components [S] and [Sy] oriented in the same direction fall on the region 5a parallel to the polarized light selecting plane of the polarizing plate 2'.

The angle α is preferably of the order of 10°. A decrease in angle θ which is usually within a range of 30° to 60° will cause the angle α to be decreased. A small difference in magnitude between the s-polarized components [S] and [Sy], thus, results.

Since requirements for the s-polarized components to be allowed to pass through the polarizing plate 2' and to illuminate the region 5a are satisfied by all light beams incident on the polarizing plate 2' in this embodiment, the readout light beams (i.e., the s-polarized components) whose directions of polarization are identical with each other fall on the region 5a. All the readout light beams are, thus, modulated uniformly by the reflective liquid-crystal panel 5, thereby allowing the light to be projected to a screen to form an image in an increased contrast therewith.

While the above discussion refers only to the s-polarized components, the polarizing plate 2' of this embodiment may produce p-polarized components based on the same principle.

The above first embodiment is described on the condition that the readout light (i.e., the s-polarized component) emerging from the polarizing plate 2' reach the region 5a of the reflective liquid-crystal panel 5 without undergoing any refraction.

Figure 5:
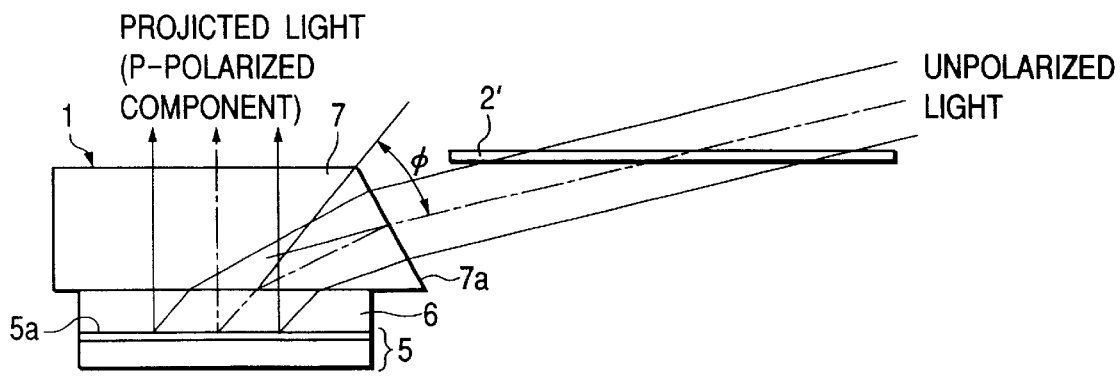
FIG. 5 is a cross sectional view which shows a projection display in which the index of refraction of a glass plate is greater than that of a coupling prism, explaning the second embodiment of this invention.

However, most of typical spatial light modulators have a light-refracting element such as a glass plate disposed between an entrance surface on which the readout light is incident and a light-modulating layer. For example, the spatial light modulator 1 of the first embodiment may set the index of refraction of the glass plate 6 greater than that of the coupling prism 7 and direct the luminous flux of the s-polarized components emerging from the polarizing plate 2', as shown in FIG. 5, to the entrance surface 7a of the coupling prism 7 with a constant inclination. In this case, the luminous flux of the s-polarized components is refracted and directed to the region 5a of the reflective liquid-crystal panel 5. The s-polarized components are kept perpendicular to the travel direction of light beams thereof at all times. Thus, physically parallel arrangement of the polarized light selecting plane of the polarizing plate 2' and the region 5a of the reflective liquid-crystal panel 5 causes the direction of polarization of the s-polarized component of each light beam to be rotated before being refracted according to an angle of refraction of the light beam, thereby resulting in ununiformity of directions of polarization of the readout light beams on the region 5a of the reflective liquid-crystal panel 5. This will be discussed below in detail with reference to FIG. 6.

Figure 4:
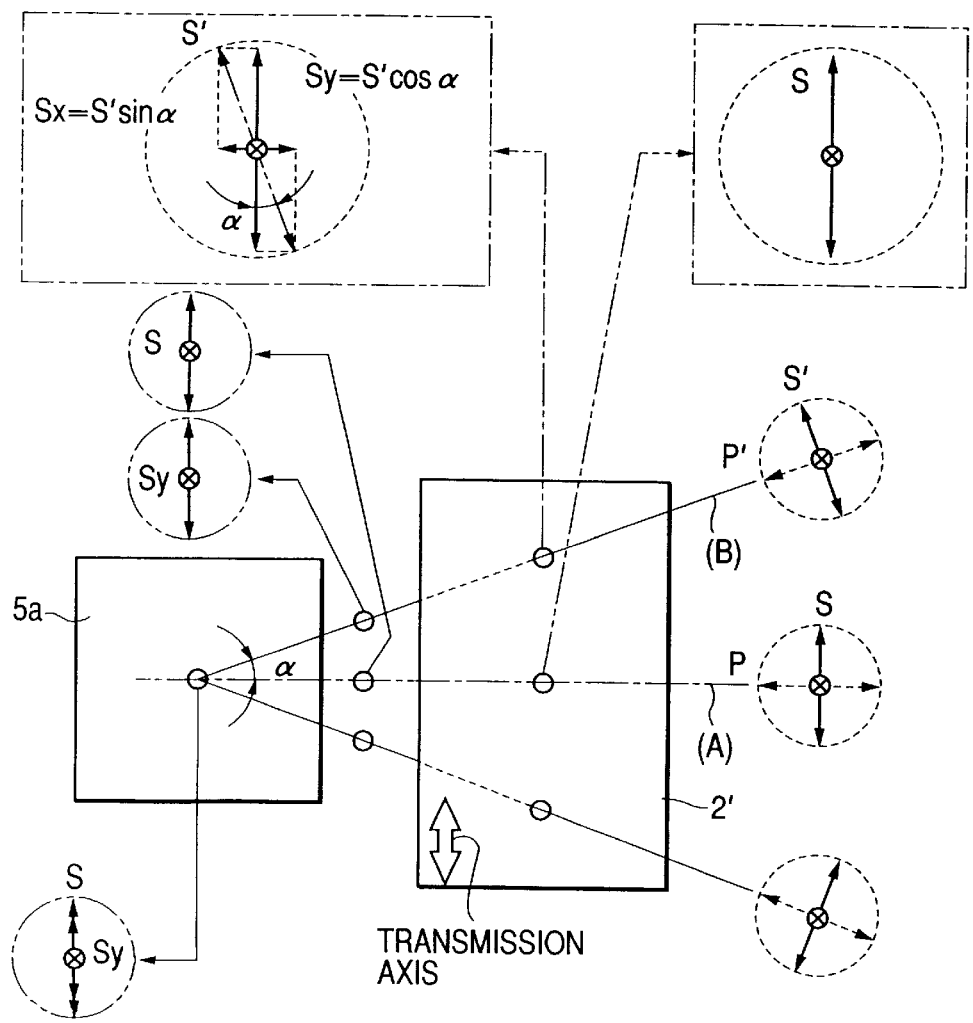
FIG. 4 is an illustration which shows polarization of beams of readout light passing through a polarizing plate and falling on a liquid-crystal panel of a spatial light modulator in the projection display in FIG. 3.
Figure 6:
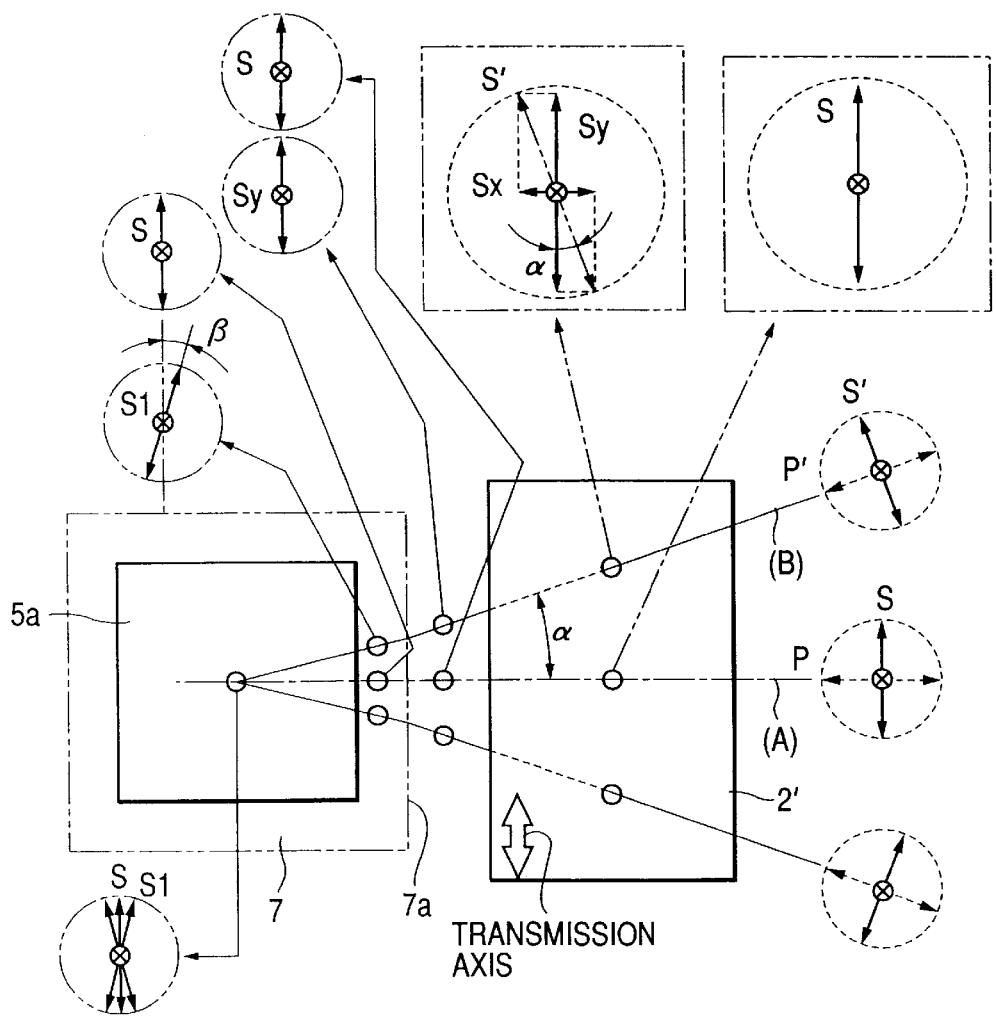
FIG. 6 is an illustration which shows polarization of beams of readout light passing through a polarizing plate and falling on a liquid-crystal panel of a spatial light modulator in the projection display in FIG. 5.

FIG. 6 represents in a broken line the coupling prism 7 which is omitted in FIG. 4 for the brevity of illustration. For the simplicity of explanation, it is assumed that light beams are refracted only on the entrance surface 7a of the coupling prism 7 without undergoing refraction through the glass plate 6.

As clearly in comparison of FIG. 6 with FIG. 4, the polarized light selecting function performed by the polarizing plate 2' is the same as in the first embodiment shown in FIGS. 3 and 4, but the s-polarized components [S] and [Sy] of the light beams (A) and (b) emerging from the polarizing plate 2' are refracted on the entrance surface 7a of the coupling prism 7 and directed to the region 5a of the reflective liquid-crystal panel 5.

One of light beams of a conical luminous flux which is perpendicular to the transmission axis of the polarizing plate 2' is refracted within a plane perpendicular to the polarized light selecting plane of the polarizing plate 2' and the region 5a of the reflective liquid-crystal panel 5, so that the direction of polarization of the s-polarized component [S] is not changed, but the other light beams not perpendicular to the transmission axis of the polarizing plate 2' undergo the refraction through the coupling prism 7, thereby causing the direction of polarization of the s-polarized component [Sy] to be rotated through an angle β, which results in the s-polarized component [S1] shown in FIG. 6.

Therefore, the s-polarized component of the light beam (A) and the s-polarized component [S1] of the light beam (B) whose directions of polarization are different from each other fall on the region 5a of the reflective liquid-crystal panel 5, thereby resulting in reduction in contrast between an image produced by light modulated by the reflective liquid-crystal panel 5 and a screen.

Figure 7:
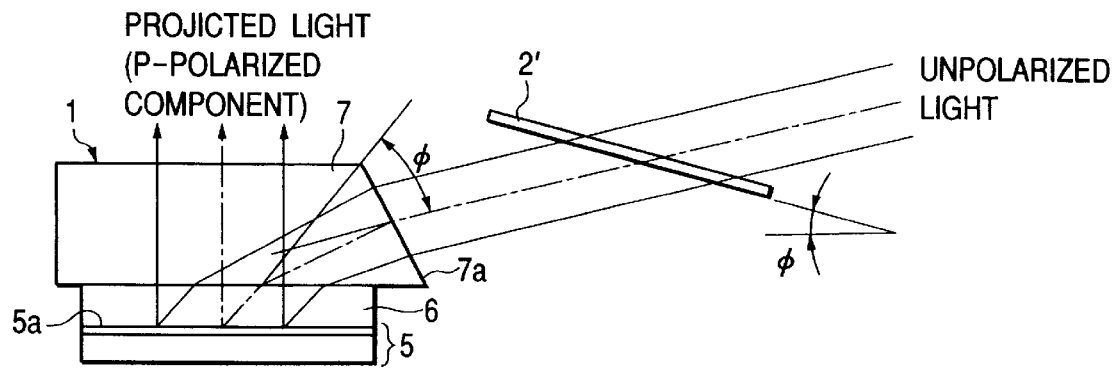
FIG. 7 is a cross sectional view which shows a projection display according to the second embodiment of the invention.

FIG. 7 shows a projection display according to the second embodiment which is designed to alleviate the above problem in an arrangement wherein the polarized light selecting plane of the polarizing plate 2' is inclined to the liquid-crystal layer of the reflective liquid-crystal panel 5 to have an optically parallel relationship therebetween.

Specifically, the polarized light selecting plane of the polarizing plate 2' is inclined to the liquid-crystal layer of the reflective liquid-crystal panel 5 by an angle φ determined by an angle ψ (i.e., an angle of refraction) which the optical axis of luminous flux of light incident on the polarizing plate 2' makes with the optical axis of readout light of each s-polarized component so that the polarized light selecting plane of the polarizing plate 2' is not physically perpendicular to the liquid-crystal layer of the reflective liquid-crystal panel 5, but they have an optically parallel relationship which meets the same optical conditions as those in the first embodiment.

Figure 8:
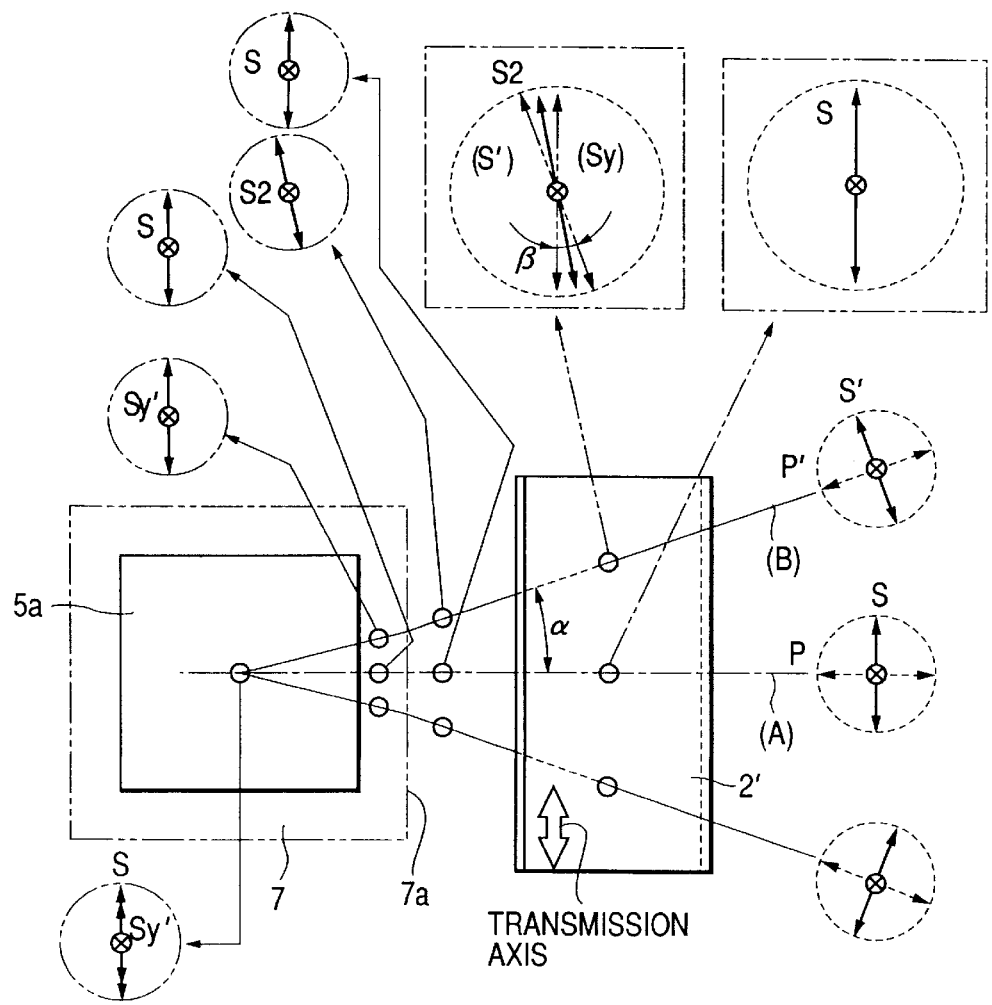
FIG. 8 is an illustration which shows polarization of beams of readout light passing through a polarizing plate and falling on a liquid-crystal panel of a spatial light modulator in the projection display in FIG. 7.

The angle φ of inclination of the polarizing plate 2' will be explained with reference to FIG. 8.

The light beam (A) is perpendicular to the transmission axis of the polarizing plate 2', so that the s-polarized component [S] is allowed to pass through the polarizing plate 2' similar to FIG. 6. For the light beam (B), the polarizing plate 2' performs the function of selecting the s-polarized component on a line on which a plane that is perpendicular to the travel direction of a light beam and a plane that contains the transmission axis of the polarizing plate 2' and is perpendicular to the polarized light selecting plane of the polarizing plate 2' cross each other to allow the s-polarized component [S2] to pass therethrough.

The direction of polarization of the s-polarized component [S2] is shifted through an angle β from that of the s-polarized component [Sy] as shown in FIGS. 4 and 6 and is reverse to an angular shift of the direction of polarization caused by change of the s-polarized component [Sy] into the s-polarized component [S1] through the refraction, as shown in FIG. 6.

Specifically, the angle θ of inclination of the polarizing plate 2' is so determined as to rotate the direction of polarization of the spolarized component [S2] to cancel an angular shift in direction of polarization of the s-polarized component of the light beam (B), as shown in FIG. 6, through the angle β caused by the refraction on the entrance surface 7a of the coupling prism 7.

Therefore, when the s-polarized component [S2] of the light beam (B) emerging from the polarizing plate 2' enters the coupling prism 7, it changes into the s-polarized component [Sy'] whose direction of polarization is the same as that of the s-polarized component [Sy] as in the first embodiment and falls on the region 5a of the reflective liquid-crystal panel 5 in the same direction of polarization as that of the s-polarized component [S] of the light beam (A).

Specifically, the projection display of the second embodiment is designed to incline the polarized light selecting plane of the polarizing plate 2' to the reflective liquid-crystal panel 5 according to the index of refraction of a refractive element such as the coupling prism 7 or the glass plate 6 so as to establish the same optical conditions as those in the first embodiment shown in FIGS. 3 and 4.

Figure 9:
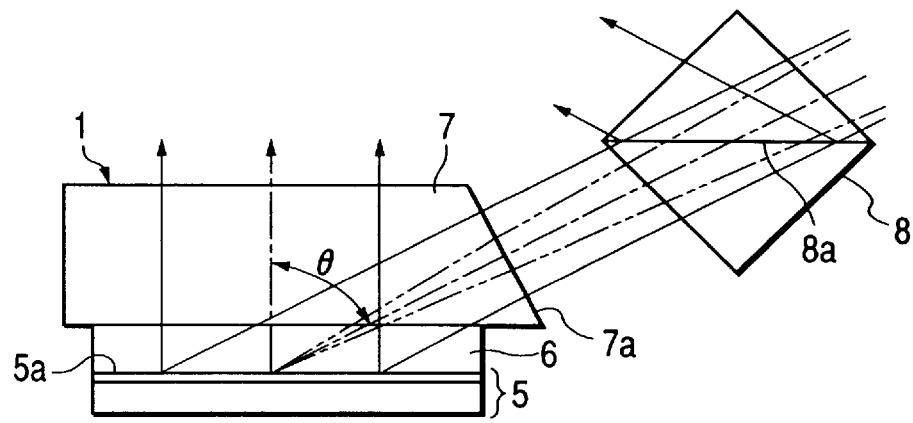
FIG. 9 is a cross sectional view which shows a projection display using a polarizing beam splitter according to the third embodiment of the invention.

The above described first and second embodiments refer to use of the polarizing plate 2', but the present invention may be used with a projection display provided with a polarizing beam splitter. FIG. 9 shows the third embodiment of a projection display using the polarizing beam splitter 8. The polarizing beam splitter 8 is so arranged that the polarized light separating plane 8a (corresponding to the polarized light selecting plane) may meet the same optical conditions as those in the first and second embodiments. Only a difference between the polarizing beam splitter 8 and the polarizing plate 2' in the first and second embodiments is to reflect other than preselected polarized components on the polarized light separating plane 8a in a given direction.

The first and second embodiments also refers to use of the reflective liquid-crystal panel 5, but a transmission liquid-crystal panel may be employed.

Figure 10:
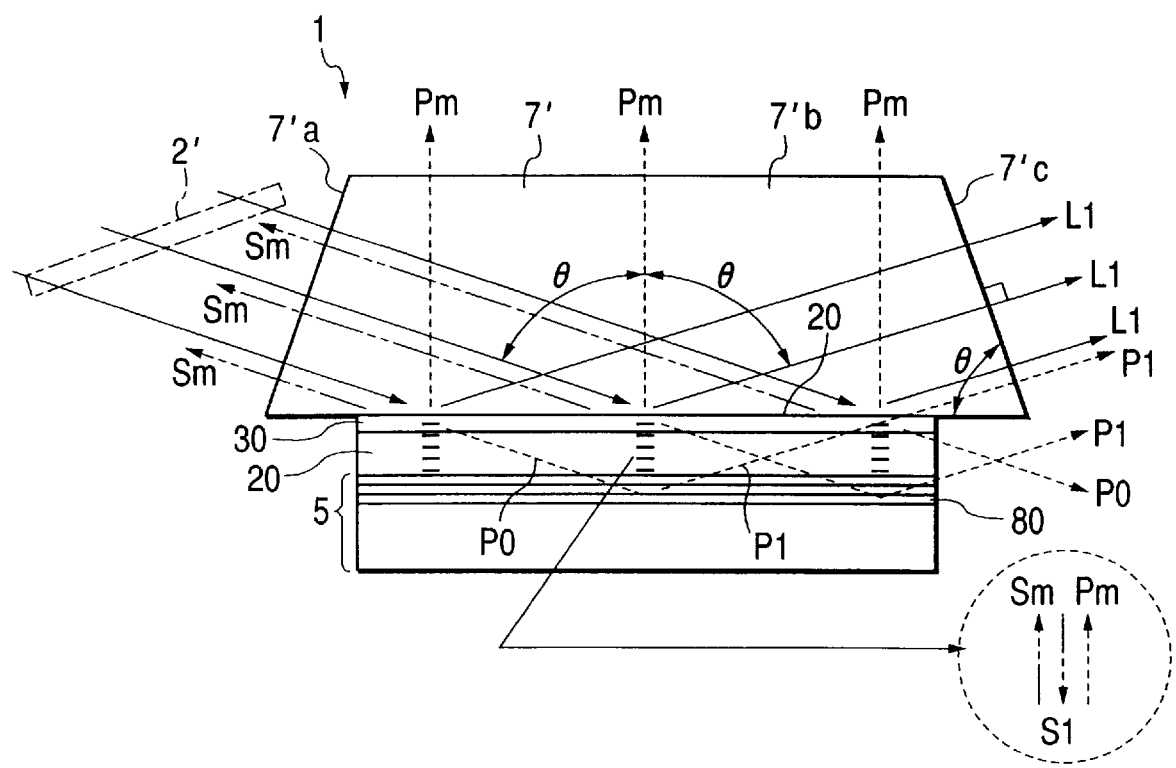
FIG. 10 is a cross sectional view which shows a spatial light modulator according to the fourth embodiment of the invention.

FIG. 10 shows the spatial light modulator 1 according to the fourth embodiment of the invention.

The spatial light modulator 1 includes the reflective liquid-crystal panel 5, the glass plate 20, the holographic color filter 30, and the coupling prism 7'.

The liquid-crystal panel 5 is formed with a lamination of an Si substrate, an active matrix driver, a pixel electrode layer, a dielectric mirror, an orientation film, a light modulating layer, an orientation film, and a transparent common electrode layer. The pixel electrode layer has formed thereon R (red), G (green), and B (blue) pixel electrodes each of which defines a sub-pixel. The three sub-pixels each corresponding to one of the three colors define one pixel.

The holographic color filter 30 is disposed on the glass plate 20 in parallel to the liquid-crystal panel 5 and consists essentially of an R-light holographic lens array, a G-light holographic lens array, and a B-light holographic lens array. Each holographic lens of each of the R-, G-, and R-light holographic lens arrays diffracts only an S-polarized component of incident light which has a wavelength corresponding to one of the three colors and converges it on corresponding one of the R, G, and B pixel electrodes at right angles.

The coupling prism 7' is disposed on the holographic color filter 30 and features a trapezoidal cross section. Specifically, the coupling prism 7' has two inward inclined side surfaces: one is the entrance surface 7a and the other is the side surface 7c. The side surface 7'c is defined by a plane which is perpendicular to a plane containing the optical axis of readout light incident on the coupling prism 7' and a line perpendicular to the upper surface of the color filter 30 (i.e., the normal at any point on the color filter 30) and which is inclined toward the entrance surface 7'a, making substantially the same angle as an incident angle θ of the readout light with an upper surface of the color filter 30 (i.e., the bottom of the coupling prism 7').

The optical axis of part (L1) of the readout light reflected by the bonding surface 20 (i.e., a boundary surface) of the coupling prism 7' and the color filter 30 is, thus, perpendicular to the side surface 7'c of the coupling prism 7'. This will cause the unwanted light (L1) to be emitted out of the coupling prism 7' without being reflected inward on the side surface 7'c.

The part (P0) of the p-polarized component of the readout light passing through the color filter 30 is reflected on the dielectric mirror 80 of the reflective liquid-crystal panel 5 and reenters the coupling prism 7' through the color filter 30, but it is, like the part (L1) of the readout light, emitted out of the coupling prism 7' completely without being reflected inward on the side surface 7'c.

Therefore, the unwanted rays (L1) and (P1) entering the coupling prism 7' all pass through the side surface 7'c that is the first exit surface, thereby eliminating the stray light within the coupling prism 7'. This avoids a decrease in contrast of images projected by the spatial light modulator onto a screen and shading thereof.

The entrance surface 7'a of the coupling prism 7' is oriented perpendicular to the optical axis of the readout light emitted from the light source 4 (not shown), and the exit surface 7'b is formed parallel to the color filter 30, thereby causing returned light of the s-polarized component (Sm) that is unwanted modulated light and the p-polarized component (Pm) that is light to be projected onto a screen (not shown) to be directed to the entrance surface 7'a and the exit surface 7'b at right angles, respectively, without becoming the stray light within the coupling prism 7'.

Figure 11:
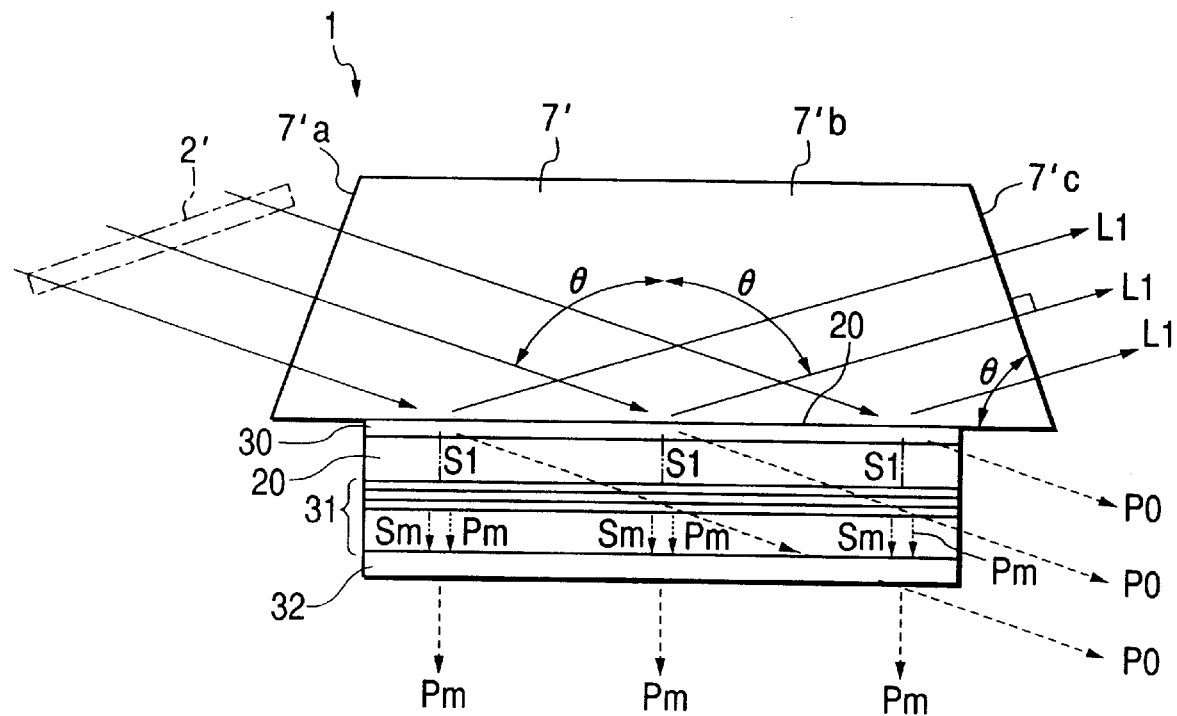
FIG. 11 is a cross sectional view which shows a spatial light modulator according to the fifth embodiment of the invention.

FIG. 11 shows the spatial light modulator 1 according to the fifth embodiment of the invention which is different from the fourth embodiment only in that the transmission liquid-crystal panel 31 is used instead of the reflective liquid-crystal panel 5, and the polarizing plate 32 allowing only the p-polarized components to pass therethrough is bonded to the bottom of the transmission liquid-crystal panel 31. Other arrangements are identical, and explanation thereof in detail will be omitted here.

The s-polarized components (S1) diffracted by the color filter 30 for colors R, G, and B are converged on corresponding pixel electrodes of the liquid-crystal panel 31, but the s- and p-polarized components (Sm) and (Pm) produced depending upon the degree of modulation in the liquid-crystal panel 31 are emitted to the polarizing plate 32 where only the p-polarized components (Pm) are transmitted therethrough as rays of light to be projected onto a screen (not shown).

Therefore, the spatial light modulator 1 of this embodiment, as different from the fourth embodiment using the reflective liquid-crystal panel 5, prevents the p-polarized components passing through the color filter 30 without being diffracted from being returned back to the color filter 30 and then entering the coupling prism 7' again and allows the s-polarized components (Sm) modulated by the liquid-crystal panel 31 to be absorbed only by the polarizing plate 32 without being reflected to the coupling prism 7'.

The reflection of the part (L1) of the readout light entering the coupling prism 7' on the bonding surface 20 of the coupling prism 7' and the color filter 30 is the same as that in the fourth embodiment.

In the above described fourth and fifth embodiments, a protection layer made of a glass material such as BK-7 may be interposed between the coupling prism 7' and the color filter 30. In this case, the incident angle θ of the readout light is set to a value different from that in the above embodiments depending upon the index of refraction of the protection layer. The same effect as that in the above embodiments is offered by changing the orientation of the entrance surface 7'a and the side surface 7'c depending upon the incident angle θ.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A lighting apparatus for use in a spatial light modulator comprising:

a light source emitting a luminous flux of unpolarized light whose optical axis is oriented with a given inclination to a light modulating layer of a spatial light modulator; and a polarizing element selectively allowing a component of the unpolarized light polarized only in one direction to pass therethrough and directing the polarized component to the light modulating layer of the spatial light modulator as readout light, said polarizing element being so disposed in an optical path of said luminous flux that a polarized light selecting plane of said polarizing element is optically oriented parallel to the light modulating layer of the spatial light modulator.

2. A lighting apparatus as set forth in claim 1, wherein the spatial light modulator has a refracting element disposed between the polarized light selecting plane of said polarizing element and the light modulating layer of the spatial light modulator, and wherein the polarized light selecting plane of said polarizing element is oriented with an inclination to the light modulating layer of the spatial light modulator according to an index of refraction of the refracting element.

3. A lighting apparatus as set forth in claim 1, wherein said polarizing element is a polarizing plate.

4. A lighting apparatus as set forth in claim 1, wherein said polarizing element is a polarizing beam splitter.

5. A spatial light modulator comprising:

a liquid-crystal panel modulating an incident ray in units of pixel;

a holographic color filter disposed parallel to said liquid-crystal panel, diffracting and separating components polarized linearly in one direction from readout light incident at a given angle, said holographic color filter converging the linearly polarized components on corresponding pixels of primary colors; and a coupling prism having upper and bottom surfaces, connected at the bottom surface to an entrance surface of said holographic color filter on which the readout light is incident, said coupling prism also having two opposed side surfaces between the upper and bottom surfaces one of which is an entrance surface through which the readout light emitted from a light source is transmitted at said given angle to said holographic color filter and the other of which is defined by a plane which is perpendicular to a plane containing an optical axis of the readout light incident on said coupling prism and a line perpendicular to a surface of said holographic color filter connected to said coupling prism and which is inclined toward the entrance surface of said coupling prism, making substantially the same angle as said given angle of incidence of the readout light with the surface of said color filter connected to said coupling prism.

6. A spatial light modulator as set forth in claim 5, wherein said liquid-crystal panel is of a reflective type, and wherein said holographic color filter converges the linearly polarized components at right angles on the corresponding pixels of primary colors, and wherein said coupling prism has the entrance surface defined by a plane perpendicular to the optical axis of the readout light emitted from the light source and the upper surface defined by a plane oriented parallel to the bottom surface.

7. A spatial light modulator as set forth in claim 5, further comprising a transparent medium having a high index of refraction interposed between the bottom surface of said coupling prism and the entrance surface of said holographic color filter.

* * * * *